United States Patent [19]
Broadwater, Sr.

[11] Patent Number: 5,203,055
[45] Date of Patent: Apr. 20, 1993

[54] SNAP ASSEMBLY FOR SECURING FLEXIBLE COVERINGS

[76] Inventor: Thomas D. Broadwater, Sr., 1300 Winyah Dr., Columbia, S.C. 29203

[21] Appl. No.: 823,467

[22] Filed: Jan. 22, 1992

[51] Int. Cl.⁵ .................... B60P 7/00; A47H 13/00
[52] U.S. Cl. .................... 24/462; 24/460; 135/119; 160/369; 296/100
[58] Field of Search .................... 24/460, 461, 462; 160/369, 349.1, 349.2, 392, 395; 135/119, 89; 296/100

[56] References Cited

U.S. PATENT DOCUMENTS

| | | |
|---|---|---|
| 515,814 | 3/1894 | Braun . |
| 588,244 | 8/1897 | Roberts . |
| 873,901 | 12/1907 | Sauer, Jr. . |
| 2,766,814 | 10/1956 | Sedlacek . |
| 3,009,515 | 11/1961 | Albee, Jr. .................... 160/369 |
| 3,103,083 | 9/1963 | Seeger . |
| 3,141,221 | 7/1964 | Faulls, Jr. .................... 24/462 |
| 3,486,788 | 12/1969 | Benton .................... 139/119 |
| 4,011,607 | 3/1977 | Davidoff . |
| 4,103,401 | 8/1978 | Conley . |
| 4,107,826 | 8/1978 | Tysdal .................... 24/460 |
| 4,153,981 | 5/1979 | Stuppy .................... 24/462 |
| 4,231,141 | 11/1980 | Derrick et al. .................... 24/460 |
| 4,273,377 | 6/1981 | Alexander . |
| 4,279,064 | 7/1981 | Simme . |
| 4,639,033 | 1/1987 | Wheatley et al. . |
| 4,647,103 | 3/1987 | Walblay . |
| 4,682,642 | 7/1987 | Hogshead, III et al. .................... 24/460 |
| 4,693,508 | 9/1987 | Pettit . |
| 4,792,179 | 12/1988 | Stevens . |
| 4,838,602 | 6/1989 | Nett . |
| 4,923,240 | 5/1990 | Swanson . |
| 5,039,246 | 8/1991 | Woodruff et al. .................... 160/395 |

Primary Examiner—Victor N. Sakran
Attorney, Agent, or Firm—Pollock, Vande Sande & Priddy

[57] ABSTRACT

A cover gripping assembly for securing a flexible cover to a side member of a frame. A marginal edge portion of the cover is frictionally gripped between the inner surface of an elongated channel member having an inwardly facing C-shaped arcuate sector defining an elongated cavity, and the outer surface of an elongated rod when the latter is received in the cavity. The outer surface of the rod is generally congruent with the inner surface of the C-shaped arcuate sector. The frictional gripping force of the gripping assembly on the cover may be enhanced when tension on the cover is increased by providing the channel member with an outwardly facing C-shaped channel member for causing a body portion of the cover to be folded back relative to the marginal edge portion of the cover. The inner surface of the inward C-shaped arcuate sector or the outer surface of the rod, or both, may be provided with a plurality of longitudinally-extending ribs for frictionally engaging the cover.

18 Claims, 5 Drawing Sheets

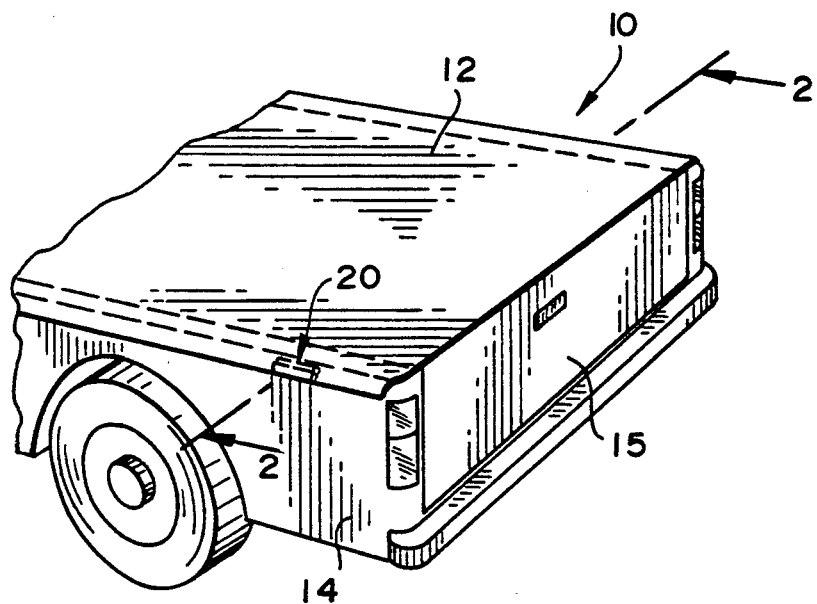
FIG_1
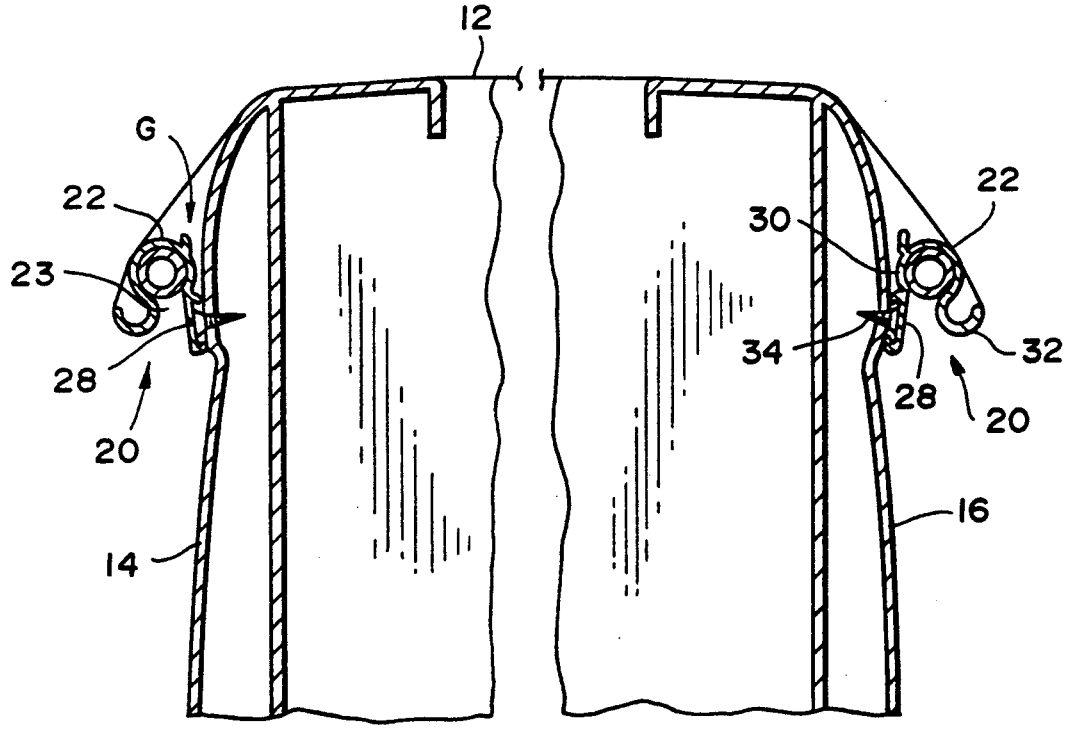
FIG_2

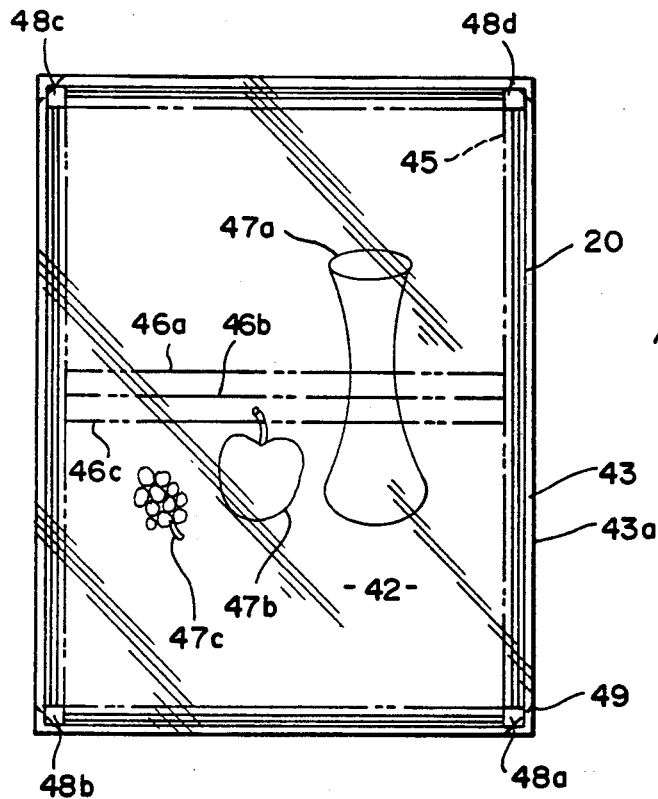
FIG_8
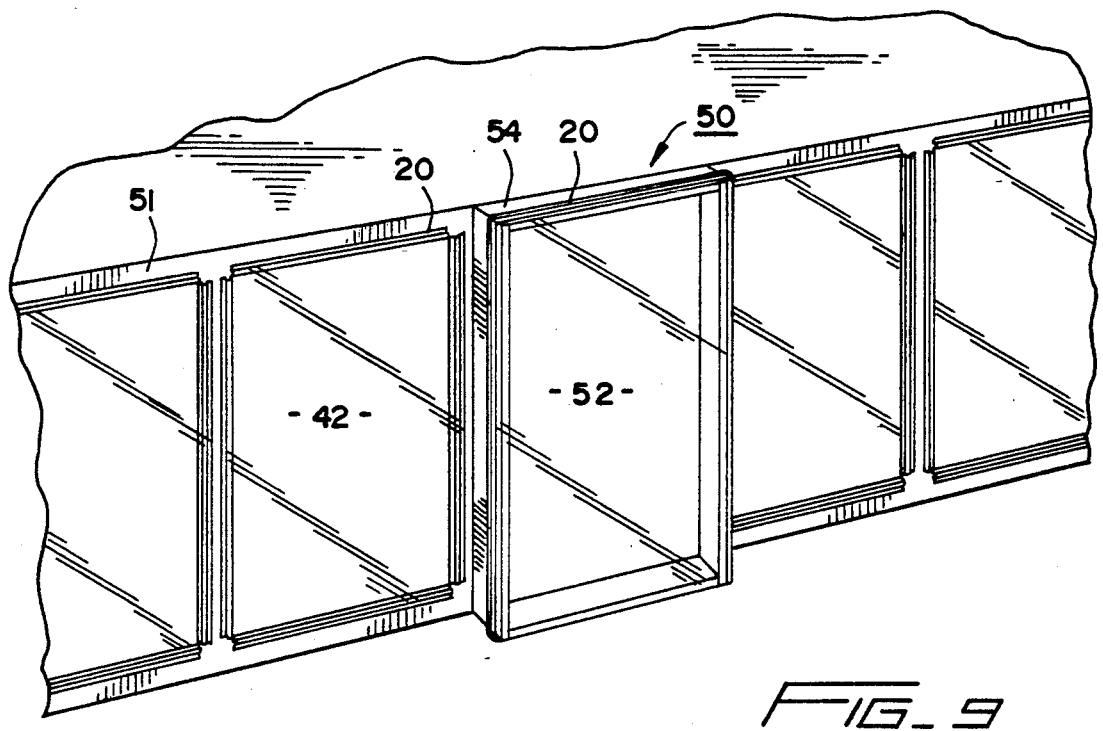
FIG_9

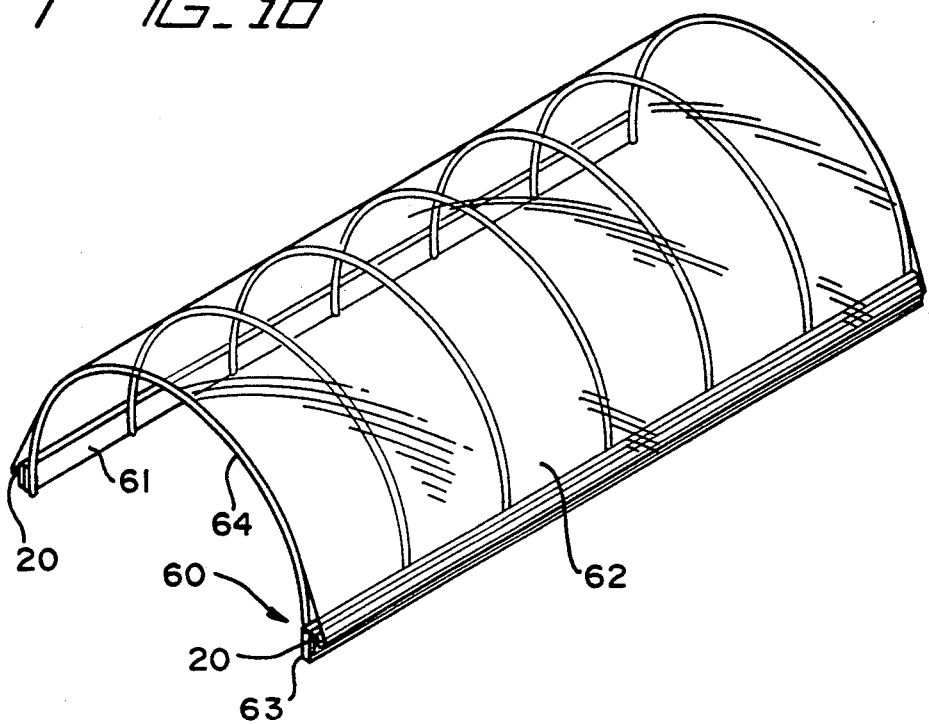
FIG_10
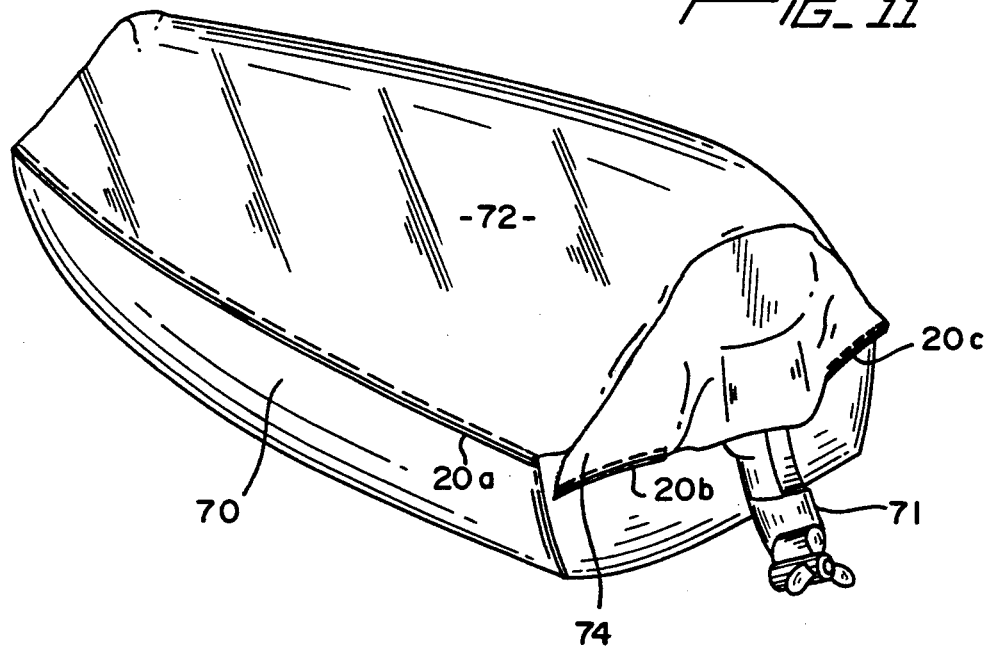
FIG_11

5,203,055

SNAP ASSEMBLY FOR SECURING FLEXIBLE COVERINGS

FIELD OF INVENTION

The present invention relates to fastening devices for securing flexible coverings over a frame, such as those around a door, window or truck bed having an open top.

BACKGROUND OF THE INVENTION

Some vehicles, such as pick-up trucks and some semi-trailers, have a rear cargo bed which is open at its top. These cargo beds are surrounded by a frame, typically including spaced-apart, generally parallel sidewalls, a front wall and a rear wall or tailgate.

There are many situations in which it is desirable to cover the open cargo bed to protect its contents from the weather or to prevent materials from being accidently dislodged from the bed. Furthermore, covering an open cargo bed is mandatory in those states which have enacted laws requiring a cover over any materials hauled in a truck or trailer.

Many securing arrangements for covers presently in use have one or more serious disadvantages. For example, with one type of cover, spaced-apart snaps along the outside of the sidewalls of the vehicle bed cooperate with mating snaps attached to a flexible cover. In another well-known type of cover, the cover is provided with grommets along its outer edge which are secured to hooks on the outer surfaces of the sidewalls of the bed. These types of covers have the disadvantages that tension forces on the covers are not distributed evenly along the edge of the cover but are concentrated in the smaller areas defined by the grommets or snaps. The material used for these covers sometimes is not strong enough to withstand such concentrated loads.

The need for strong covering material also prevents the use of relatively thin inexpensive woven or non-woven materials in the manufacture of such prior art covers. As a further disadvantage, these covers are typically dimensioned to stretch tightly in a horizontal manner across the top of the cargo bed directly between the cargo bed sidewalls, which unduly limits the amount of materials that can be hauled at any one time.

Securing devices which keep the cover in place by securing the entire length of a marginal edge portion typically depend on friction between the securing device and the cover material. However, the tensile forces on the cover are occasionally great enough due to wind forces when the vehicle is moving to cause the cover to come loose from such prior art securing devices. Thus, although these devices have the advantage that light weight material can be used for the cover, an improved device for holding such covers in place is needed.

SUMMARY OF THE INVENTION

It is therefore an object of this invention to provide an improved apparatus for securing a cover to an open frame, such as a truck, boat and other vehicle frame, a window or door frame, a sign frame, construction site frameworks, and frameworks for greenhouses, sheds and the like. Other objects of the invention will be apparent from the following description and the claims appended hereto.

In accordance with the present invention there is provided a cover gripping assembly for securing a flexible cover to an individual frame or to a framework lattice. This assembly comprises an elongated flexible channel member, which in transverse cross section comprises an inwardly facing C-shaped arcuate sector having inner and outer spaced-apart segments defining an elongated open throat and an elongated inner cavity for receiving a marginal edge portion of the cover and at least one elongated tube or rod member serving as a snap-in member. The C-shaped arcuate sector has an inner surface for frictionally engaging one side of the marginal edge portion of the cover when the other side is engaged by an outer surface of the snap-in member. Means is provided for securing the channel member to a side member of the frame.

When the elongated snap-in member is inserted into the elongated cavity of the flexible channel member, its outer surface urges the marginal edge portion of the cover into frictional engagement with the inner surface of the C-shaped arcuate sector. Means for enhancing this engagement may be provided integral with the C-shaped arcuate sector to increase the force clamping the margin edge of the cover between the C-shaped arcuate sector and the snap-in member(s) when tension is increased on the cover.

In another aspect of the invention, the channel member comprises first and second sectors, the first sector being in the general shape of a large inwardly facing C and having inner and outer spaced-apart entrance segments defining an open throat for passing the marginal edge of a cover and at least one elongated snap-in member. The second sector functions as a grip-enhancing means and comprises an outwardly and backwardly curved extension of the outer segment of the first sector. The second sector is preferably in the general shape of a large outwardly facing C. In this embodiment of the invention, an increase in tension on the cover increases the forces which hold the cover and the snap-in member in place.

In a further aspect of the present invention, the frictional engagement between the marginal edges of the cover and the inner surface of the C-shaped arcuate portion of the channel member is increased by providing longitudinal ribs on the inner surface of the C-shaped arcuate portion.

The apparatus of the present invention may securely hold the marginal edge portion of a cover along substantially the entire edge, thus distributing the forces and permitting the use of relatively thin fabrics or films as the cover material.

BRIEF DESCRIPTION OF THE DRAWINGS

FIG. 1 is a perspective view of a portion of the carrying compartment of a pick-up truck showing a cover held in place by the cover gripping assembly of the present invention.

FIG. 2 is a sectional view of the truck compartment, cover, and cover gripping assembly as taken along line 2—2 of FIG. 1.

FIG. 8 is an elevational view of the invention as used for mounting a covering with graphic images thereon over a window sign or billboard frame;

FIG. 9 is a perspective view of the invention as used for mounting a covering over a construction site framework;

FIG. 10 is a perspective view of the invention as used to secure the covering over a greenhouse or shed framework; and, FIG. 11 is a perspective view showing the invention as used for securing a boat cover.

DETAILED DESCRIPTION OF THE INVENTION

Figure 3:
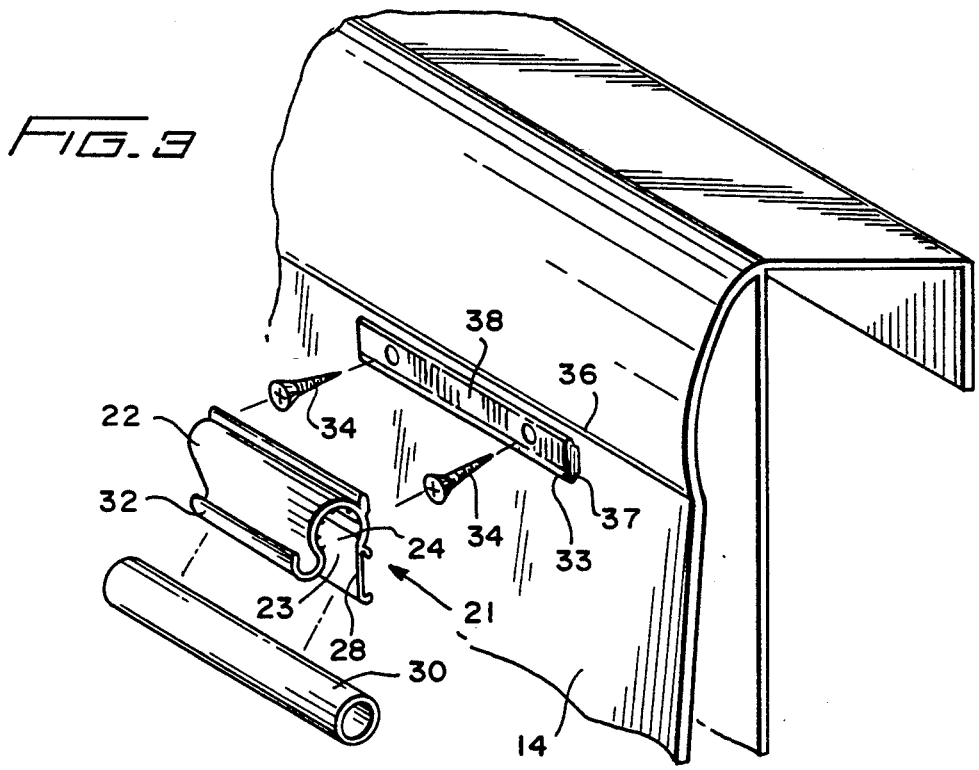
FIG. 3 is an exploded view in perspective of the cover gripping assembly shown in FIG. 2.

Referring now to the drawings, FIGS. 1 to 3 show a truck cargo compartment, generally designated 10, having sidewalls 14 and 16 and a tailgate 15. A flexible cover having a main body 12 is shown held in place over the compartment 10 by a cover-gripping assembly, generally designated 20, which is secured to sidewalls 14 and 16 by an attachment segment 28 of an elongated resilient channel member 21. Attachment segment 28 includes an inner lip 27 and an outer lip 29 for slidably engaging a mounting rail 33 fixed to the truck sidewall by screws 34,34, which are recessed within a channel 38.

Figure 4:
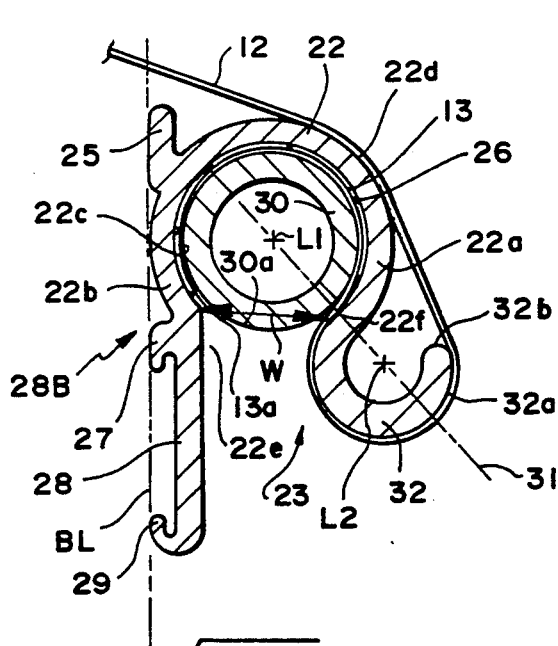
FIG. 4 is an enlarged cross-sectional view of the cover gripping assembly of FIG. 2.

As shown in FIG. 4, elongated channel member 21 comprises a first or inwardly facing arcuate sector 22, a second or outwardly facing arcuate sector 32 integral with sector 22, the attachment segment 28, and a support segment 25. An elongated rod or tube 30 is inserted into a cavity 24 formed by an inner surface 22c of first arcuate sector 22. Rod 30 and first arcuate sector 22, when assembled with a marginal edge portion 13 of the cover therebetween, holds the main cover body 12 tightly in place over the otherwise open cargo compartment 10.

Figure 6:
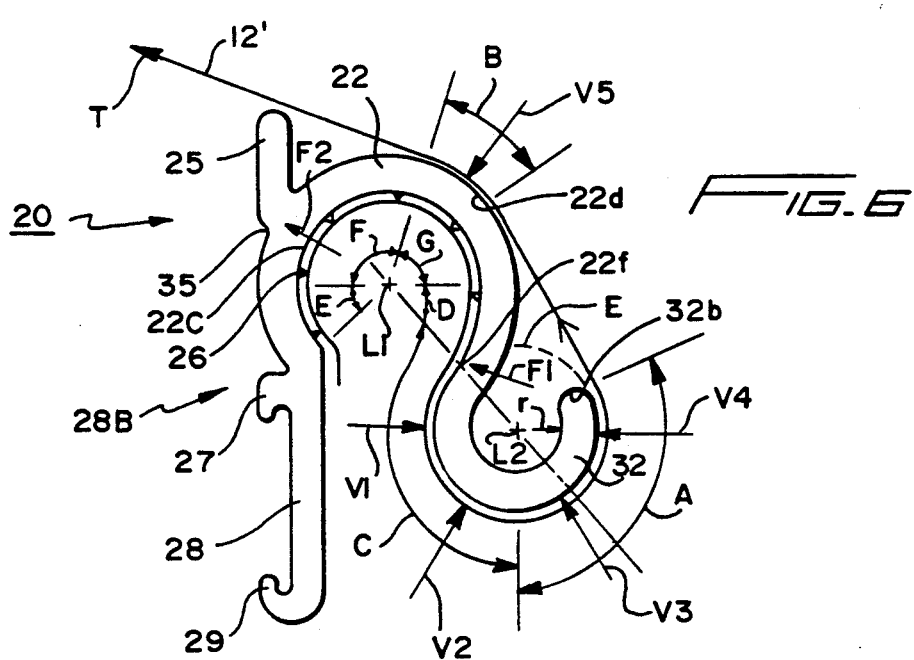
FIG. 6 is a diagrammatic representation of the cross-sectional view of FIG. 4 showing forces which act on the assembly when tension is applied to the cover.

First arcuate sector 22 has the general configuration of a laterally open "C" and generally encompasses the regions or zones which are identified in FIG. 6 as D, E, F and G. First arcuate sector 22 includes an outer segment 22a and an inner segment 22b which, together with an inner portion of attachment segment 28 and an inner portion of second sector 32, form an open throat passage 23 leading to cavity 24. The width of throat passage 23 as defined below is substantially less than the outside diameter of rod 30, such that rod 30 constitutes a snap-in element which snaps into cavity 24 in response to a lateral force sufficient to displace abutting portions of outer segments 22a and second sector 32 of channel member 21.

First arcuate sector 22 is shown in vertical cross-section as extending along the major arc of a circle from an inner throat lip 22e, where inner segment 22b joins attachment segment 28, to an outer terminus 22f, where outer segment 22a joins second arcuate sector 32. Terminus 22f preferably is substantially on an imaginary line 31 that connects the centers of the arcs of the first and second arcuate sectors, which places terminus 22f substantially opposite to lip 22e. The throat 23 has a width W which is defined as the distance between lip 22e and the opposing terminus 22f, the direction of width W being generally perpendicular to a base line BL for positioning channel member 21 adjacent to a supporting frame member, such as sidewalls 14,16. The arc of first sector 22 extends through an angle greater than 180°, preferably at least about 245°, more preferably from about 260° to about 280°, and most preferably about 270°.

In a preferred embodiment of the present invention, inner surface 22c of first arcuate sector 22 is provided with a plurality of longitudinal-extending ribs 26, preferably having a triangular cross-sectional shape with a pointed apex for engaging the cover material. Most preferably, ribs 26 are substantially uniformly spaced around the transverse cross section of inner surface 22c as seen best in FIGS. 4–5, and may suitably be spaced about 15° to about 60° apart, and preferably about 35° to about 50°, six ribs at 45° intervals being more preferable as shown.

Second arcuate sector 32 is integral with first arcuate sector 22 and, as depicted in FIGS. 2–4, 6 and 7, has the general configuration of an outwardly open "C". Second arcuate sector 32 is displaced farther from the supporting frame member (e.g. vehicle sidewalls 14,16), and from the channel member base line BL adjacent thereto, than is outer segment 22a of first arcuate sector 22. As explained below, arcuate sector 32 provides additional frictional surfaces in contact with cover body 12 and also increases frictional retention by providing forces which are perpendicular to cover body 12. In addition, the cover gripping assembly is designed to increase the retaining forces keeping marginal edge 13 and snap-in member 30 in cavity 24 as the tension in the cover increases.

At least the first arcuate sector 22 of channel member 21 is transversely resilient so that when an inwardly directed force is applied on arcuate sector 22, pressure against the marginal edge portion 13 of cover 12 is increased. The action of these forces may be understood more clearly with reference to FIG. 6, in which the tensile force acting on cover body 12 is represented by an arrow T. The tensile force results in forces within cover gripping assembly 20 which tend either to increase or to reduce the friction and the other retaining forces.

There are two main aspects of the assembly forces, and they can be considered separately. The first relates to the number of ribs 26 and/or 26a (or in the absence of such ribs, the area of inner channel surface 22c and outer rod surface 30a) and the area of other portions of channel member 21 and rod 30 in contact with the marginal edge portion 13 of cover 12. Cover 12 is retained in cover gripping assembly 20 by the combined effects of (1) friction between the cover material and the surfaces of the cover gripping assembly, and (2) the resistance of first arcuate sector 22 to being deformed far enough to allow rod 30 to slip out of cavity 24 through an expanded throat passage 23.

Frictional forces are equal to the product of the coefficient of friction between the channel member and cover materials times the magnitude of the applied force perpendicular to the opposite surfaces of cover 12. In circular arcs, such as are shown in the drawings, the perpendicular vectors, such as vectors V1, V2, V3, V4 and V5, of the applied tension force T are directed towards the longitudinal axis L1 and L2 of the arcs. Accordingly, the resulting frictional forces will be at right angles to these force vectors, and therefore tangent to the corresponding portions of the arcs and opposite to the directional pull of tension force T within cover 12. The frictional forces provided by the ribs and by the perpendicular force vectors, such as V1-V5, all aid in retaining the cover in place.

The perpendicular force vectors directed toward the axes L1 and L2 of the respective circular sections also act either in favor of or against the snap action of arcuate sector 22, which is provided by the resilience of outer segment 22a of sector 22 and resists expansion of throat passage 23. Referring to FIG. 6, the vectors acting in favor of snap action retention of rod 30 are those in region A and in region B. In region A, vectors directed toward the axis L2 of second arcuate sector 32 also tend to close throat 23 and clamp arcuate sector 22 against rod 30, and thereby increase the friction forces between the ribs and the cover material. In region B, pressure on the outer surface 22d of first arcuate sector 22 also tends to clamp arcuate sector 22 and rod 30 together.

The perpendicular force vectors tending to open throat passage 23 of gripping assembly 20 are found primarily in region C and secondarily in region D. In region C, these forces are in opposition to the forces in region A and to the resistance to bending provided by the resilience (stiffness) of the material of channel member 21. In region D, the major resistance is provided by the stiffness of the material making up channel member 21. In regions G, F and E, there are no perpendicular force vectors acting on channel 21 in opposition to forces in regions A and B. The perpendicular force vectors acting on rod 30 in regions D, E, F and G tend to balance each other, but may result in a relatively small inward net force F2 which is countered by the body of the frame or other support upon which channel member 21 is mounted. The tangential forces in regions D, E, F and G are not equal, which produces a tendency towards clockwise rotation of rod 30, which is resisted by the frictional engagements described above.

Figure 7:
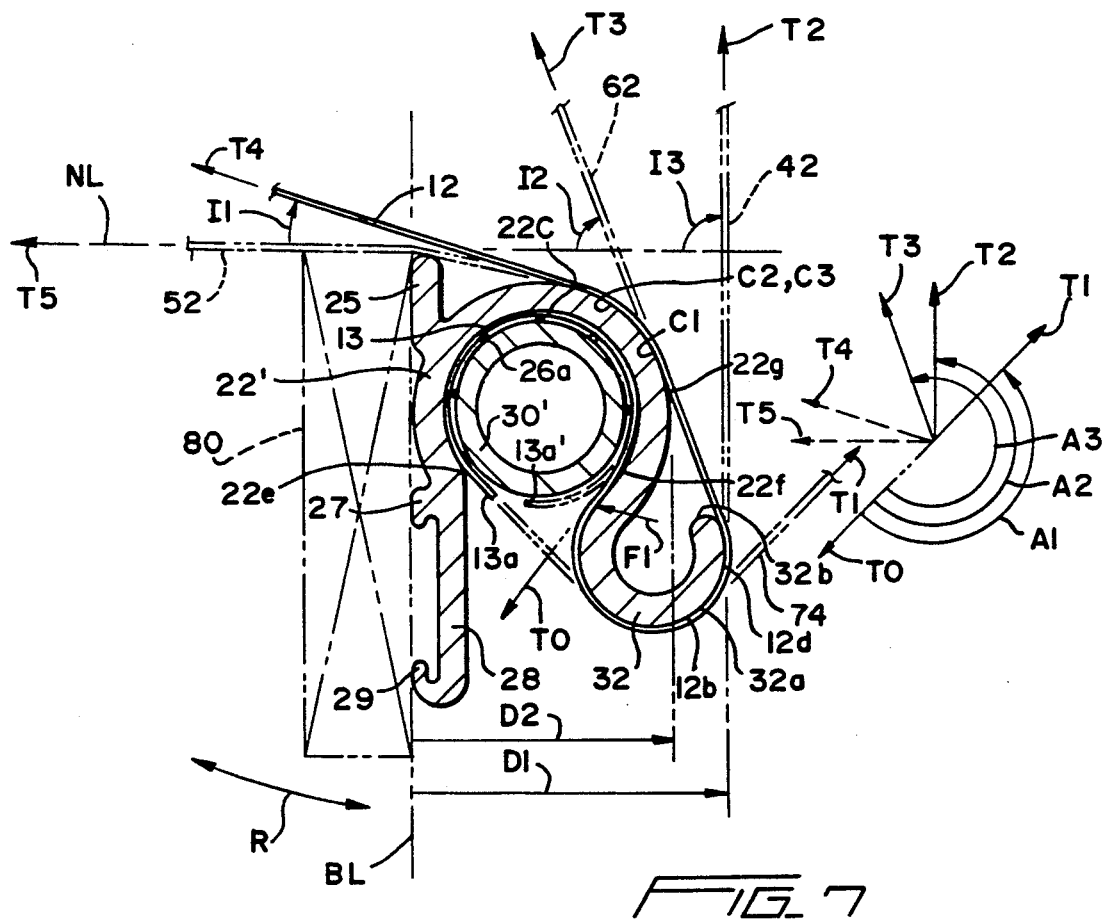
FIG. 7 is a cross-sectional view of the present invention similar to FIG. 6, but showing diagrammatically alternative methods of securing the cover in the gripping assembly of the present invention.

Referring now to FIG. 7, an important feature of the invention is that the net restraining force acting on the cover or covering as provided by the gripping assembly may be varied by varying the angle through which a body portion 12b of the cover 12 is folded back along the surface 32a of second sector 32 relative to a reference tension direction TO of a connecting portion 12c of the cover. Portion 12c connects the marginal edge and body portions of the cover 12 and is that part of cover 12 approximately adjacent to the terminus 22f marking the outer end of the outer segment 22a of sector 22.

The tensions in each of the covers 74, 42, 62, 12 and 52 are represented in FIG. 7 by tension directions T1, T2, T3, T4 and T5, respectively. As indicated diagrammatically to the right of channel member 21 in this figure, the tension directions may be used to define the angle through which cover body portion 12b is folded back relative to the reference tension direction TO, which is defined by the direction of tension in connecting portion 12c adjacent to terminus 22f of sector 22. The amount of these fold backs is represented by the angles A1, A2 and A3. For the embodiments shown, A1 is about 180°, A2 is about 225° and A3 is about 245°.

Tension directions T4 and T5 are shown in broken lines and are not assigned separate fold back angle values because these tension directions are not due entirely to second sector 32 (although they could be if the diameter of sector 32 were increased by an appropriate amount as will be understood by persons skilled in the art). This is because covers 12 and 52 also bend around outer surface 22d of first sector 22 by a significant amount. Thus, the fold back angle of tension direction T4 is angle A2 plus 70°, and the fold back angle of tension direction T5 is angle A2 plus 90°, based on the angles at which covers 12 and 52 intercept channel member 21 as discussed below.

Fold back angles between the angles A1 and A3 increase the net restraining force acting on the snap-in member and on cover marginal edge portion 13 in response to increases in cover tension because the force vectors V3 and V4 exceed the force vectors V1 and V2 by an amount sufficient to provide a net closure force F1 which tends to close throat 23 by decreasing the width W thereof. This in turn supplements the resilience of the channel material so that a greater tension force T is required to dislodge the snap-in member 30 from cavity 24. The closure force F1 also causes an increase in the frictional forces preventing slippage of cover marginal edge portion 13 relative to the outer surface of the snap-in member and the inner surface of the cavity.

The magnitude of closure force F1 increases as the distance D1 increases relative to the distance D2, where D1 is the perpendicular distance between the base line BL and the outermost segment 12d of the folded back cover portion 12b in contact with the outer surface 32a of sector 32, and where D2 is the perpendicular distance between the base line BL to the maximum outward extent 22g of the outer surface 22a of first sector 22. In generating the net closure force F1, the force vectors V3 and V4 also tend to bend or fold inward the outer end 32b of sector 32, thereby decreasing the radius r of this sector.

In this regard, the resiliency of the material of channel 21 and the thickness of this material throughout sector 32 and segment 22a of sector 22 are selected to provide relatively stiff and rough surfaces for frictionally engaging the cover material, and sufficient resiliency both for retention of rod 30 without tension in cover 12 and for effective closure action at throat 23 in response to the anticipated tension in cover 12. These requirements may be met by a semi-rigid polyvinyl chloride material as indicated below.

The thickness of base portion 28B, as made up of inner segments 22b, 25 and 28 of channel member 21, is not as critical as that of outer segment 22a of sector 22 and of sector 32 because flexure of base portion 28B is not required for the clamping action of outer segment 22a. In this regard, the elements of base portion 28B may be very stiff, or instead may be backed by the stiff and essentially inflexible frame member 80. However, some flexibility in the base portion 28B of the channel member may be desirable to provide firm seating of the support segment 25 in response to tension in the cover, particularly where there may be a gap G between support segment 25 and the frame member in the absence of tension in cover 12 as illustrated in FIG. 2.

The frame member (generally designated 80 in FIG. 7) upon which channel member 21 is mounted, may be positioned so that the corresponding cover is intercepted by the cover-gripping assembly 20 at different angles relative to a reference line NL normal (90°) to base line BL, so as to vary the area of contact between the cover material and the outer surface 22d of inward sector 22. For example, cover 42 does not contact surface 22d, cover 62 has a very small area (approximately a narrow line) of contact C1, and covers 12 and 52 have larger areas of contact C2, C3. In this regard, the channel member 21, shown in FIG. 5 has an even larger area of contact C4 along the arc B', although the closure force F1' tending to decrease the width of throat 23' is less in this embodiment because the distances D1 and D2 are approximately equal. The possibility of varying the position of frame member 80 about its longitudinal axis for the purpose of changing the intercept angle is represented in FIG. 7 by double ended arrow R.

The intercept angle I1 is about 20°, the intercept angle I2 is about 70° and the intercept angle I3 is about 90° for covers 12, 62 and 42, respectively. The cover lines 74, in FIG. 7, which represent the portion of cover 72 over motor 71 (FIG. 11), is generally parallel to the reference tension direction TO, and has an intercept angle (not shown) of about 135° relative to line NL. This is believed to be about the maximum intercept angle for operation of grip-enhancing sector 32 because it may provide only slight throat closure forces in response to tension in direction T1.

Another group of forces are those involved in the attachment of channel member 21 to sidewalls 14,16 of a truck body or other supporting frame. Lower lip 29 resists the majority of these forces, which are in the form of bending moments which become shear forces when applied to attachment screws 34. The remainder of these bending moments (such as those applied adjacent to notch 35) cause channel 21 to press against sidewalls 14,16 at upper lip 27 and upper vertical segment 25. The forces caused by the latter bending moments are principally compressive forces where the gripping assembly rests against sidewalls 14, 16.

Figure 5:
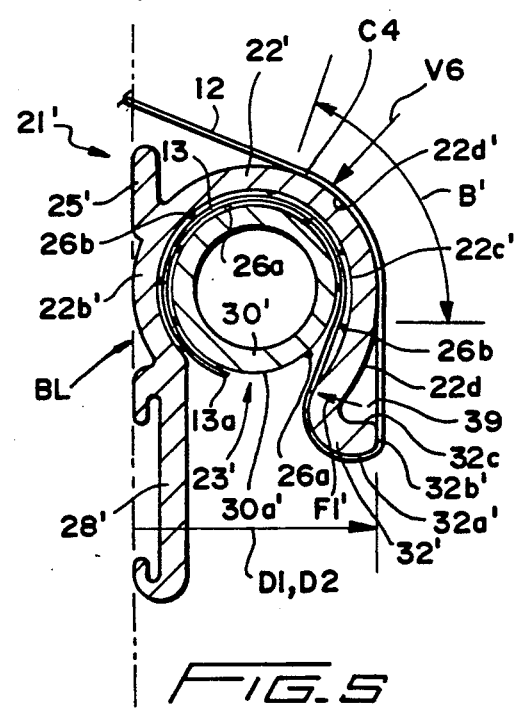
FIG. 5 is a sectional view of a modification of the cover gripping assembly of the invention.

FIG. 5 shows a modification of channel member 21 in which the second arcuate sector 32' extends through an arc significantly less than the arc of second arcuate sector 32 shown in FIGS. 2-4, 6 and 7. The outer end 32b' of sector 32 extends laterally outward for a distance sufficient for the tension forces on cover 12 to have a perpendicular force vector component V6 pressing against the outer surface 22d' over a region B', which has an arc and a corresponding surface area substantially larger by a factor of 1.5 to 2.0 than those of region B in FIG. 6. In the embodiment shown in the drawings, the force-enhancing means for increasing the friction between marginal edge portion 13 of cover 12 and gripping assembly 20 have an arcuate configuration. However, other configurations of the force-enhancing means may be used, such as a solid rod-like portion integral with first arcuate sector 22. In a preferred configuration, second arcuate sector 32 extends through an arc of at least about 225°, preferably about 230° to about 290°, more preferably about 260° to about 280°, most preferably about 270°.

Cover gripping assembly 20 may be secured directly to sidewalls 14,16 of truck compartment 10. However, in a preferred embodiment, the inner segment 22b of channel member 21 is integral with an attachment segment 28 having an inner lip 27 and an outer lip 29 as may be seen in FIG. 4. As shown in FIG. 3, attachment segment 28 is adapted to slidably engage a rail member 33 which is secured to sidewall 14 of the truck compartment by fastening elements 34. Rail 33 is provided with upper and lower recessed portions 36 and 37 for engaging corresponding lips 27 and 29 of attachment segment 28.

Rod 30 may be hollow to provide greater resiliency for flexing inwardly, or it may be solid. In either configuration, it may be made of a compliant or of a semi-rigid or rigid material, a semi-rigid but bendable material being preferred. Its diameter is selected to fit snugly inside the cavity 24 formed by first arcuate sector 22.

The distance across the throat 23 must be selected so that rod 30 can be pressed into cavity 24 while surrounded by the marginal edge portion 13 of cover 12. Rod 30 preferably is substantially coextensive with channel member 21, and may be a single continuous piece or in two or more sections.

The gripping channel member 21 may be made of a variety of materials such as, for example, a semi-rigid plastic or metal, such as steel or aluminum, and in a variety of sizes. In one specific example, channel member 21 is extruded from semi-rigid polyvinyl chloride and hollow cavity 24 in first sector 22 of channel member 21 has an internal diameter of about 17 mm and six (6) longitudinally extending ribs of triangular cross section. Each of these ribs 26 are preferably about 0.6 mm high and are spaced equally about inner surface 22c. A C-shaped curved extension of first sector 22 forms the second sector 32, which has an internal diameter of about 8 mm and a center displaced 10 mm outwardly (FIG. 6) from the center of first sector 22. The wall thickness throughout channel member 21 is about 2 mm. Tubular rod 30 also is extruded from rigid polyvinyl chloride, and has an outer diameter of about 17 mm and a wall thickness of about 1 mm.

The cover-gripping assembly of the present invention is particularly useful with thin flexible materials such as, for example, polyethylene film. A cover 12 of such film may be secured to cover gripping assembly 20 by inserting marginal edge 13 into cavity 24 so that it will form a lining against inner surface 22c, and then inserting rod 30 into place. Alternatively, marginal edge 13 may be wrapped around rod 30 and the so wrapped rod 30 is then inserted into place. Due to the resilience of outer segment 22a relative to inner segment 22b and the smaller width of throat 23 relative to the diameter of cavity 24, rod 30 becomes seated in cavity 24 with a snap-action and rod 30 therefore serves as a snap-in element or member.

Marginal edge portion 13 may be wrapped around rod 30 either in the direction shown in FIGS. 4 and 5 wherein the leading edge 13a of cover marginal edge portion 13 is adjacent to inner segment 22b, or in the reverse direction as shown by the broken line 13a' in FIG. 7 where the leading edge of the marginal edge portion 13 is adjacent to outer segment 22a. As also illustrated in FIG. 7, the ribs 26a may extend along the periphery of rod 30', instead of along the length of inner surface 22c (FIGS. 4-6); or ribs may extend along both the inner surface and the rod periphery as shown in FIG. 5 where ribs 26a extend longitudinally along the surface 30a, of rod 30' and ribs 26b extend longitudinally along channel member inner surface 22c'.

Although the illustrations above involve a vehicle cover 12 for covering an open cargo compartment of a truck, the cover and cover-gripping assembly of the present invention have many other applications, some of which are illustrated in FIGS. 8-11. Referring now to FIG. 8, there is shown a cover 42 secured to a wooden or metal frame 45 by cover gripping assembly 20 which engages the marginal edge portion 43 of cover 42 as previously described, and as also illustrated by the broken line 42 in FIG. 7. The frame 45 may be that of a sign or bill-board, such as employed for advertising along streets and highways, and as illustrated by the graphic FIGS. 47a, 47b and 47c which are printed on cover 42.

FIG. 8 also illustrates how the invention may be used to secure a window covering 42, such as may be used to reduce heat loss in the winter time. The broken lines 46a, 46b and 46c illustrate the upper and lower sashes of a conventional window frame. However, the cross frame members represented by lines 46a, 46b and 46c may be spaced apart as cross bracing for sign and billboard applications. In such applications to rectangular frames, it is preferably to stop the ends of the channel members 21 short of each of the corners 48a, 48b, 48c and 48d for ease in keeping wrinkles out of the corresponding corners of cover 42. Since these corners are free of the adjacent ends of the channel members, the leading edge 43a of cover 42 may be folded under the secured cover along a fold line 49 to provide a somewhat neater appearance at the corners of the secured cover.

FIG. 9 illustrates use of the cover-gripping assembly 20 to secure coverings for a building framework 50, such as found at construction sites before the walls of the building are completely assembled. The wall framing 51 utilizes the same cover arrangement for cover 42 as shown in FIGS. 7 and 8. The door framing 54 has a cover 52 secured thereto by cover-gripping assembly 20 as illustrated by the broken line 52 in FIG. 7.

FIG. 10 illustrates use of cover-gripping assembly 20 to secure an outer covering 62 over a frame 60 for a greenhouse, shed, hut or the like, or for a temporary enclosure as may be used at a construction site. The frame 60 has opposing base members 61 and 63 secured together by arch-like cross members 64. Each of the base members 61 and 62 has a corresponding cover-gripping assembly 20 along the outside thereof for gripping corresponding marginal edge portions of the cover as illustrated by broken line 62 in FIG. 7.

The cover-gripping assembly 20 of the invention also may be used to secure a boat cover 72 or the like over a boat 70 and a rear portion 74 of the cover over a motor 71. As illustrated in FIG. 11, the cover-gripping assembly may comprise separated segments 20a, 20b and 20c located at different positions such that the invention is readily adaptable to cover structures of widely varying shapes and sizes.

The specific embodiments described herein are for the purpose of illustrating the present invention by way of examples. Workers skilled in the art will recognize variations thereof that fall within the scope of this invention, and therefore this scope is limited only by the claims appended hereto and equivalents of the features defined therein.

What is claimed is:

1. A cover gripping assembly for securing a marginal edge portion of a flexible cover to a side member of a frame, said assembly comprising:

an elongated channel member comprising an inward arcuate sector having a transverse configuration generally in the form of an inwardly facing C and defining a cavity, said inward sector comprising inner and outer segments in opposing relation to define an open and longitudinally extending throat providing access to said cavity, at least a portion of said outer segment being resilient, and at least a portion of an inner surface of said inward sector being adapted for frictionally engaging said marginal edge portion of the cover;

attachment means connected to said inner segment of the inward sector for securing said channel member to said side member of the frame;

grip-enhancing means integral with said outer segment of the inward sector for increasing said frictionally engagement in response to an increase in tension on said cover, said grip-enhancing means causing a body portion of said cover adjacent to said marginal edge portion to be folded back through an angle of at least about 180°, and comprising an outward arcuate sector having a transverse configuration generally in the form of an outwardly facing C, said inward and outward sectors being integrally formed with a transverse configuration substantially in the shape of an S; and, at least one elongated snap-in member having an outer surface generally congruent with said inner surface of the inward sector, at least a portion of said outer surface being adapted for frictionally engaging said marginal edge portion of the cover, and said snap-in member having a transverse dimension relative to a transverse dimension of said cavity such that insertion of said snap-in member transversely into said cavity causes said inner surface portion and said outer surface portion to be pressed into frictionally engagement with the marginal edge portion of said cover, said open throat having a width less than said transverse dimension of the snap-in member by an amount sufficient to cause said snap member to pass through said throat with a snap action for restraining said snap-in member in said cavity.

2. A cover gripping assembly according to claim 1 wherein said outward arcuate sector has an outer arcuate portion, wherein said inner segment is defined at least in part by a base line for positioning said channel member relative to a supporting surface of said frame side member, wherein said outer arcuate portion of the outward sector is adapted to position a corresponding segment of said folded back cover body portion at a first distance from said base line, wherein an outer surface of said outer segment of the inward sector extends outward to a maximum extent at a second distance from said base line, and wherein the relationship of said first distance to said second distance is such that an increase in tension in said cover body causes the width of said throat to decrease.

3. A cover gripping assembly according to claim 2 wherein said first distance is at least substantially equal to said second distance such that said body portion may be folded back through an angle of at least about 225° before being engaged by the outer surface of said outer segment of the inward arcuate sector.

4. A cover gripping assembly according to claim 2 wherein said first distance exceeds said second distance at least by an amount sufficient for said body portion to be folded back through an angle of at least about 245° before being engaged by the outer surface of said outer segment of the inward arcuate sector.

5. A cover gripping assembly according to claim 1 wherein the inner surface of said inward arcuate sector comprises a plurality of longitudinally-extending ribs for frictionally engaging said marginal cover portion.

6. A cover gripping assembly according to claim 1 wherein an inward extent of said inner segment is defined by a base line for positioning said channel member adjacent to a supporting surface of said frame side member, and wherein said attachment means for securing said channel member to said side member comprises a mounting segment extending in a direction parallel to said base line.

7. A cover gripping assembly according to claim 6 wherein said attachment means further comprises a horizontal rail member having upper and lower recessed portions, and means for attaching said rail member to said side member of the frame; and wherein said mounting segment is provided with inwardly oriented upper and lower lips for slidingly engaging said recessed portions of the horizontal rail member.

8. A cover gripping assembly according to claim 1 wherein said inward sector follows a generally circular arc of at least about 245°, and wherein said outward sector follows a generally circular arc of at least about 225°.

9. A cover gripping assembly according to claim 1 wherein said inward and outward sectors each follow a generally circular arc in the range of about 260° to about 280°.

10. A cover gripping assembly for securing a marginal edge portion of a flexible cove to a side member of a frame, said assembly comprising:

an elongated channel member comprising an inward arcuate sector having a transverse configuration generally in the form of an inwardly facing C and defining a cavity, said inward sector comprising inner and outer segments in opposing relation to defined an open and longitudinally extending throat providing access to said cavity, at least a portion of said outer segment being resilient, and at least a portion of an inner surface of said inward sector being adapted for frictionally engaging said marginal edge portion of the cover;

attachment means connected to said inner segment of the inward sector for securing said channel member to said side member of the frame;

grip-enhancing means integral with said outer segment of the inward sector for increasing said frictionally engagement in response to an increase in tension on said cover, said grip-enhancing means causing a body portion of said cover adjacent to said marginal edge portion to be folded back through an angle of at least about 180°, and comprising an outward arcuate sector having an outer arcuate portion and a transverse configuration generally in the form of an outwardly facing C, said inner segment of the inward sector being defined in at least in part by a base line for positioning said channel member relative to a supporting surface of said fame side member, said outer arcuate portion of the outward sector being adapted to position a corresponding segment of said folded back cover body portion at a first distance from said base line, an outer surface of said outer segment of the inward sector extending outward to a maximum extent at a second distance from said base line, and the relationship of said first distance to said second distance being such that an increase in tension in said cover body causes the width of said throat to decrease; and, at least one elongated snap-in member having an outer surface generally congruent with said inner surface of the inward sector, at least a portion of said outer surface being adapted for frictionally engaging said marginal edge portion of the cover, and said snap-in member having a transverse dimension relative to a transverse dimension of said cavity such that insertion of said snap-in member transversely into said cavity causes said inner surface portion sand said outer surface portion to be pressed into frictionally engagement with the marginal edge portion of said cover, and said open throat having a width less than said transverse dimension of the snap-in member by an amount sufficient to cause said snap member to pass through said throat with a snap action for restraining said snap-in member in said cavity.

11. A cover gripping assembly according to claim 10 wherein said first distance is at least substantially equal to said second distance such that said body portion may be folded back through an angle of at least about 225° before being engaged by the outer surface of said outer segment of the inward arcuate sector.

12. A cover gripping assembly according to claim 10 wherein said first distance exceeds said second distance at least by an amount sufficient for said body portion to be folded back through an angle of at least about 245° before being engaged by the outer surface of said outer segment of the inward sector.

13. A cover gripping assembly according to claim 10 wherein the inner surface of said inward sector comprises a plurality of longitudinally-extending ribs for frictionally engaging said marginal cover portion.

14. A cover gripping assembly according to claim 10 wherein said attachment means for securing said channel member to said side member comprises a mounting segment extending in a direction parallel to said base line.

15. A cover gripping assembly according to claim 14 wherein said attachment means further comprises a horizontal rail member having upper and lower recessed portions, and means for attaching said rail member to said side member of the frame; and wherein said mounting segment is provided with inwardly oriented upper and lower lips for slidingly engaging said recessed portions of the horizontal rail member.

16. A cover gripping assembly according to claim 10 wherein said inward and outward sectors are integrally formed with a transverse configuration substantially in the shape of an S.

17. A cover gripping assembly according to claim 16 wherein said inward sector follows a generally circular arc of at least about 245°, and wherein said outward sector follows a generally circular arc of at least about 225°.

18. A cover gripping assembly according to claim 16 wherein said inward and outward sectors each follow a generally circular arc in the range of about 260° to about 280°.

* * * * *